(No Model.) 2 Sheets—Sheet 1.
J. F. McELROY.
ELECTRICAL HEATER.
No. 500,288. Patented June 27, 1893.
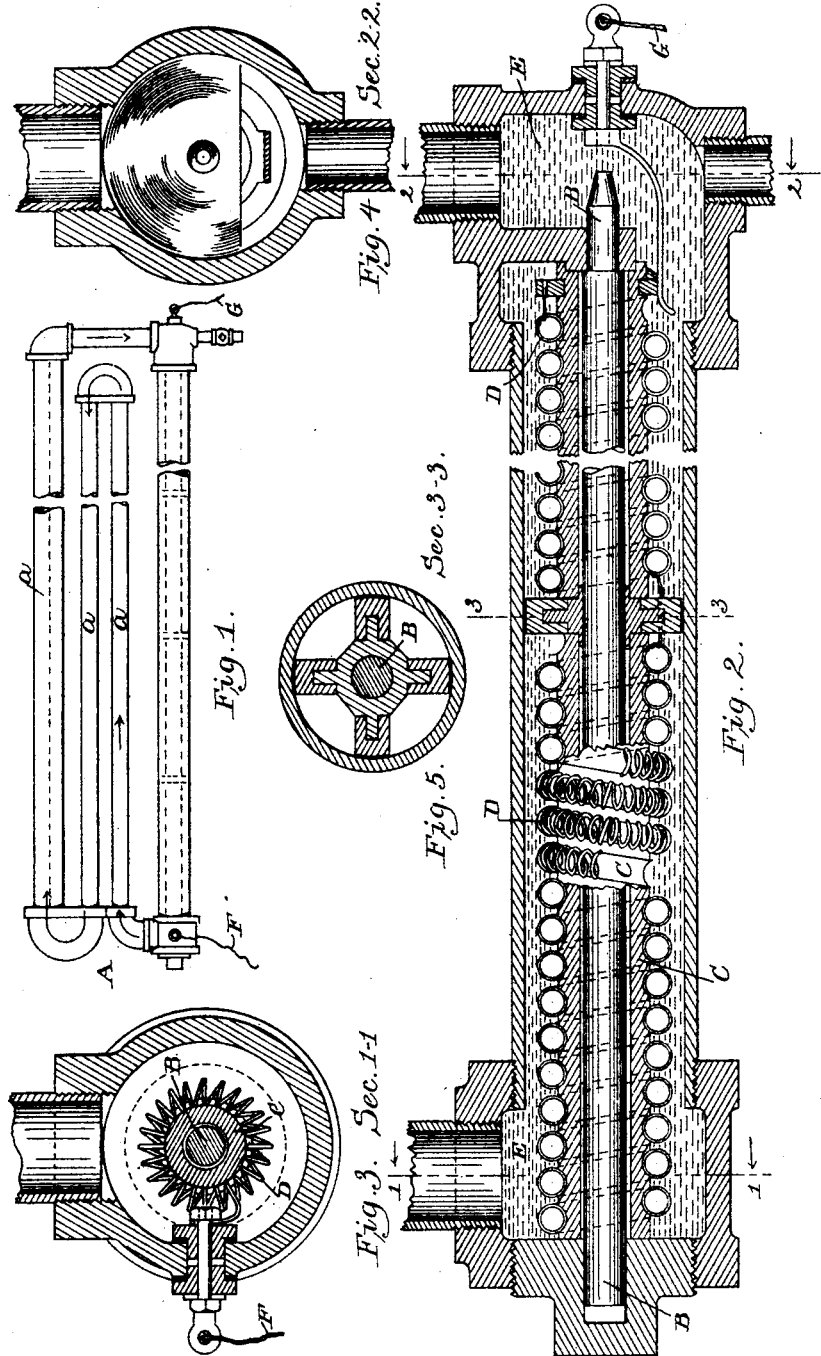
WITNESSES:
John W. Fisher
Walter E. Ward
INVENTOR,
James F. McElroy
BY
Frederick W. Cameron
ATTORNEY.

(No Model.) 2 Sheets—Sheet 2.
J. F. McELROY.
ELECTRICAL HEATER.
No. 500,288. Patented June 27, 1893.
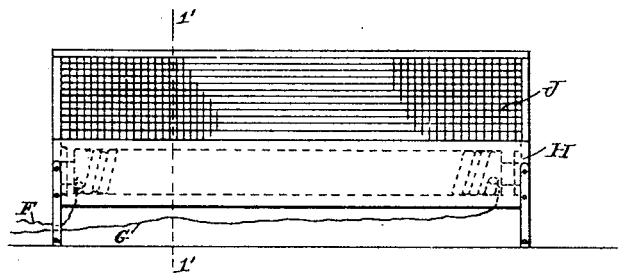
Fig. 6
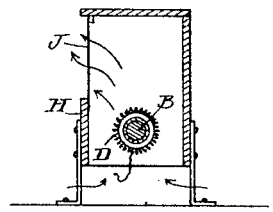
Fig. 7. Sec.1'-1'
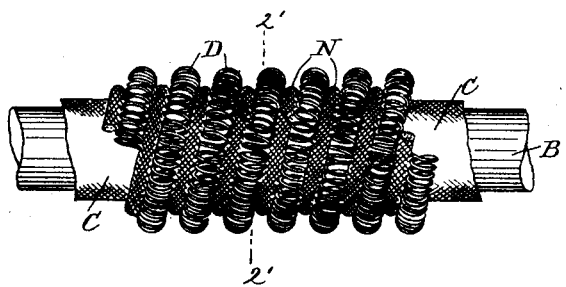
Fig. 8.
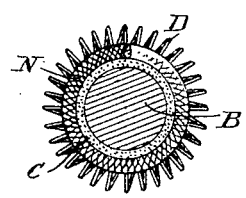
Fig. 9. Sec 2'-2'
WITNESSES:
John W. Fisher
Walter E. Ward
INVENTOR,
James F. McElroy
BY
Frederick W. Cameron.
ATTORNEY.

UNITED STATES PATENT OFFICE.

JAMES F. McELROY, OF ALBANY, NEW YORK, ASSIGNOR TO THE CONSOLIDATED CAR-HEATING COMPANY, OF WHEELING, WEST VIRGINIA.

ELECTRICAL HEATER.

SPECIFICATION forming part of Letters Patent No. 500,288, dated June 27, 1893.

Application filed October 1, 1892. Serial No. 447,523. (No model.)

*To all whom it may concern:*

Be it known that I, JAMES F. MCELROY, a citizen of the United States, residing at the city and county of Albany, State of New York, have invented a new and useful Improvement in Electrical Heaters, of which the following is a specification.

My invention relates to mechanism for converting the energy of an electric current into heat energy for the purpose of warming an apartment; and the object of my invention is to provide a device for heating street cars, railway trains or houses by electricity. I accomplish this object by means of the mechanism illustrated in the accompanying drawings, in which—

Figure 1 is an elevation of a radiator A. Fig. 2 is a longitudinal section through the lower pipe of the radiator A. Fig. 3 is a cross section along the lines 1—1 on Fig. 2. Fig. 4 is a cross section along the lines 2—2 on Fig. 2. Fig. 5 is a cross section along the lines 3—3 on Fig. 2. Fig. 6 is an elevation of the second method of mounting my heater, in which the winding is in contact with the atmosphere. Fig. 7 is a section along the lines 1'—1' on Fig. 6. Fig. 8 is a detail view showing a substance placed between the adjacent layers of the wire, and Fig. 9 is a section along the lines 2'—2' on Fig. 8.

Similar letters refer to similar parts throughout the several views.

Around the spindle B, I place an insulating substance C which may be porcelain, as shown in Fig. 2 of the drawings, or it may be of asbestus, as shown in Fig. 7, or other suitable heat resisting insulating substance. Around the insulating substance on the spindle B, I wind in a spiral path the wire D in a continuous spiral form, in such a manner that the wire touches the insulating substance only at one edge of each spiral. These spirals are formed and wound after the manner of a spiral spring, and the coil of the spirally wound wire is passed about the insulating material on the spindle B beginning at one end of the spindle and continuing along the spindle toward its opposite end, each layer of the coil being separated from the adjoining layer by the insulating material surrounding the spindle, so as to prevent electrical contact. I also place between the adjacent layers wicking N, or similar substance, as shown in Fig. 8, when I use my heater in direct contact with the atmosphere. In this way, the spirally formed coil of wire is drawn out and wound about the insulating substance on the spindle in such a manner that no two successive spirals are in contact with each other. In consequence of this winding, I am enabled to place upon the non-conductor a very large amount of wire, so that the wire at all points is entirely insulated and so that a current traversing this wire cannot be short-circuited between any two parts of the winding. By this method of arranging my wire in the form of a spiral spring, I provide for the expansion of the wire when heated. The wire instead of becoming loose and bunching and thus short-circuiting, remains tightly wound, the expansion being taken up by the spring of the wire. If two adjoining spirals should by the expansion be drawn into contact, there would be no appreciable loss of force; simply one of the spirals would be interfered with.

There is no danger of two successive layers of spirals coming in contact with each other, separated as they are by the insulating material, but if this should occur, it would result simply in one of the layers being short-circuited and no appreciable injury would take place.

By my method of winding the wire, having but one point of the edge of each spiral in contact with the insulating substance and the spirals separated from each other and the layers of spirals separated in their path along the non-conducting substance, the air or liquid in which this winding may be placed can circulate freely on all sides thereof. Thus the insulating material is protected from excessive heat and the atmosphere and liquid are in contact with the greater portion of the wire. In this way, I am enabled to place a very large amount of wire on a small cylindrical insulator and thus obtain a very great amount of heat energy from the electrical current.

My apparatus may be used in this form and connected between the poles of an ordinary dynamo, so that the current of electricity will pass through the long spiral and cause the wire to become heated.

In the drawings, I show two methods of mounting my heater, in one of which I have shown my heater placed within the lower pipe of a radiator A being suitably mounted therein, as shown in Fig. 2. Within the radiator A, I place a liquid, preferably linseed oil E. The radiator A is composed of a series of pipes, a, connected with each other as shown in Fig. 1, after the manner of an ordinary radiator in which hot water is used for heating.

I usually allow for the expansion of the liquid within the radiator by omitting to fill the pipes full—as is shown by dotted lines in the upper pipe of Fig. 1.

I prefer to make the circuit of oil entirely closed because of the oxidizing effect which takes place in oil when heated and exposed to the atmosphere.

I connect my heater at each end of the lower pipe of the radiator between the poles of an ordinary dynamo by means of the wires F and G in such a manner that the surface of the pipe shall be insulated from the electric wire, so that persons may not be injured by coming in contact therewith. I do not wish to limit myself however to the use of oil or other liquid in contact with my heater, since I may use it as shown in Figs. 6 and 7, in which the atmosphere is brought in direct contact with the wire and the apartment heated without the intervention of any foreign substance. In order that this may be accomplished, it is advisable to coat the wire with a suitable substance to prevent oxidation. For this reason, I nickel plate the wire, or coat it with a substance to prevent oxidation.

I place the cylinder containing the wire wound as described within the cabinet H, which is provided with a box open at the bottom, raised a short distance from the floor of the apartment, as shown in Figs. 6 and 7, and provided along one side with a wire screen J extending from the top of the box downward a short distance in order to allow for a circulation of the air from beneath the box as shown by arrows in Fig. 7. In this way, I protect the heater from coming into contact with the occupants of the apartment in which it is placed, and provide for the atmosphere circulating about it and becoming heated.

What I claim as my invention, and desire to secure by Letters Patent, is—

1. In an electrical heater, a wire wound in the form of a spiral spring extending in a spiral path about a cylindrically formed non-conductor, in such a manner that each spiral shall come into contact with the non-conductor at one point only and the layers of spirals shall be separated from each other, substantially as described and for the purpose set forth.

2. In an electrical heater, the combination of an insulating substance, a wire coiled in the form of a spiral spring extending in a spiral path about said insulating substance, a non-conducting material placed between the adjacent layers of the said spring, substantially as described and for the purpose set forth.

JAMES F. McELROY.

Witnesses:
EDWIN A. SMITH,
WILLIAM P. EDDY.